(12) United States Patent
Kurozasa et al.

(10) Patent No.: US 7,038,801 B2
(45) Date of Patent: May 2, 2006

(54) DATA OUTPUT SYSTEM AND DOCUMENT READ SYSTEM

(75) Inventors: Yoshiharu Kurozasa, Kawanishi (JP); Toshihiro Yamanaka, Ikoma (JP)

(73) Assignee: Sharp Kabushiki Kaisha, Osaka (JP)

( * ) Notice: Subject to any disclaimer, the term of this patent is extended or adjusted under 35 U.S.C. 154(b) by 963 days.

(21) Appl. No.: 09/950,889

(22) Filed: Sep. 10, 2001

(65) Prior Publication Data

US 2002/0036796 A1    Mar. 28, 2002

(30) Foreign Application Priority Data

Sep. 11, 2000    (JP)    ............................. 2000-274567

(51) Int. Cl.
*G06F 15/00* (2006.01)

(52) U.S. Cl. .................. 358/1.15; 358/1.14; 358/1.16; 358/1.17; 709/218; 709/223; 380/243

(58) Field of Classification Search ............... 358/1.14, 358/1.15, 116, 117; 709/219, 223, 224, 209; 348/14.01; 361/681; 375/225; 701/209; 710/62; 380/243; 713/170
See application file for complete search history.

(56) References Cited

U.S. PATENT DOCUMENTS

| | | | |
|---|---|---|---|
| 6,177,950 B1 * | 1/2001 | Robb | 348/14.01 |
| 6,226,096 B1 * | 5/2001 | Ouchi | 358/1.14 |
| 6,327,141 B1 * | 12/2001 | Kim | 361/681 |
| 6,339,477 B1 * | 1/2002 | Mori | 358/1.14 |
| 6,522,971 B1 * | 2/2003 | Tanaka | 701/209 |
| 6,591,297 B1 * | 7/2003 | Challener et al. | 709/224 |
| 6,718,378 B1 * | 4/2004 | Machida | 709/223 |
| 6,735,622 B1 * | 5/2004 | Andreoli et al. | 709/219 |
| 6,738,841 B1 * | 5/2004 | Wolff | 710/62 |
| 6,760,369 B1 * | 7/2004 | Chida | 375/225 |
| 6,789,113 B1 * | 9/2004 | Tanaka | 709/223 |
| 6,952,772 B1 * | 10/2005 | Deo et al. | 713/170 |
| 6,952,780 B1 * | 10/2005 | Olsen et al. | 380/243 |

FOREIGN PATENT DOCUMENTS

JP    2000-318272    11/2000

OTHER PUBLICATIONS

U.S. Appl. No. 09/859,089, filed May 16, 2001, Katsuya Taniguchi.

* cited by examiner

*Primary Examiner*—Kimberly Williams
*Assistant Examiner*—Satwant Singh
(74) *Attorney, Agent, or Firm*—David G. Conlin; David A. Tucker; Edwards Angell Palmer & Dodge LLP

(57) ABSTRACT

A data output system is composed of i) a portable telephone provided with memory for storing data received via a communication line, and ii) an MFP provided with an interface to be connected to the portable phone, for outputting the data stored in the memory of the portable phone, wherein the portable phone includes a display section for displaying received data, and an instructing section for selecting at least one of received data displayed in the display section and instructing the MFP to output the selected data; and the MFP includes a data communication section which starts communication of data according to an output instruction given from the portable phone.

23 Claims, 5 Drawing Sheets

DATA OUTPUT SYSTEM AND DOCUMENT READ SYSTEM

FIELD OF THE INVENTION

The present invention generally relates to a data output system and a document read system, and more particularly relates to a data output system and a document read system which permit printing of communication data stored in a portable terminal equipment such as a portable phone, or reading out of image data recorded on a sheet, etc., to be transferred to the portable terminal equipment.

BACKGROUND OF THE INVENTION

In recent years, demands for portable phones as information terminals have been increasing as represented by i-mode, NTT DoCoMo, and such portable phones serving as information terminals become inevitable in the information society.

In the meantime, the development for higher performances of PDAs (Personal Digital Assistants) provided with telephone function or PDAs connectible to generally used portable phones has been progressed.

The foregoing portable phone generally performs data transmission, or an accounting process; however, with such small size display, it is difficult for the user to recognize the contents of the received communication data. The portable phone has a function of transmitting communication data as input therein by the user using the communication means of FAX or electronic mail (E-mail). However, the portable phone does not have a function of transmitting image data recorded on a sheet, etc.

Similarly, the PDAs are capable of transmitting and receiving communication data using the communication means of FAX, electronic mail (E-mail), I-FAX (internet FAX), etc.; however, such PDAs also have the described problems.

SUMMARY OF THE INVENTION

It is an object of the present invention to provide a data output system and a document read system composed of a portable terminal equipment and a data output device or a scanner, which permit communication data stored in a portable terminal equipment to be printed out or image data recorded on a sheet, etc., to be read out to be transferred to the portable terminal equipment.

In order to achieve the foregoing object, a data output system of the present invention is characterized by being composed of i) a portable terminal equipment provided with data storage means for storing data received via a communication line, and ii) a data output device provided with portable terminal connection means, to be connected to the portable terminal equipment, for outputting the data stored in the data storage means of the portable terminal equipment, wherein:

the portable terminal equipment includes:

a display section for displaying received data, and an instructing section for selecting at least one of received data displayed in the display section and instructing the data output means to output the selected data; and the data output device includes:

a data communication section which starts communication of data according to an output instruction given from the portable terminal equipment.

According to the data output system of the foregoing structure, the portable terminal equipment is connected to the data output device after confirming the data to be requested for printing, and the connected data output device executes a data output process according to the output instruction. Therefore, until the selection of the data to be requested for printing has been completed, other user can use the data output device, thereby realizing a service environment can be used by many people in an efficient way. Moreover, in the case where the data output device has been used by other user, the data to be requested for printing can be selected by operating the portable terminal equipment in a wait state before giving an output instruction to the data output device.

The data to be communicated by the data communication section preferably includes data received by the portable terminal equipment data regarding the data output device.

The data regarding the data output device may include data for use in setting a print mode and data regarding an installation place of the data output device.

It is desirable that the foregoing data output system be arranged such that upon establishing a connection between the portable terminal equipment and the data output device, the data regarding the data output device is transmitted from the data output device to the portable terminal equipment, and the data regarding the data output device is displayed in the display section of the portable terminal equipment.

It is preferable that the portable terminal equipment include communication data conversion means for converting selected communication data into a printable format.

It is preferable that the data output means further includes counter means for counting a number of sheets printed, wherein account data including the number of sheets printed as counted by the counter means is prepared, and the account data is transferred to the portable terminal equipment together with a message indicative of a completion of a printing operation.

It is also preferable that the data output system be arranged such that after completing a printing operation and displaying a message indicative of a disconnection from the data output device in the display section of the portable terminal equipment, the account data is displayed in the display section.

It is preferable that data output system be arranged such that the portable terminal equipment further includes:

connection means to be connected to the data output device for exchanging data with the data output device, and communication data receiving means for receiving communication data.

It is preferable that the data output system be arranged such that the portable terminal equipment further includes print mode setting means for setting a print mode for printing selected communication data.

It is preferable that the data output system be arranged such that the data output device further includes:

print data obtaining means being capable of obtaining print data stored in the portable terminal equipment via the portable terminal equipment connection means, and printing means for printing the print data obtained by the print data obtaining means.

It is preferable that the data output system be arranged such that the data output device further includes:

counter means for counting a number of sheets printed, and print log data transfer means for transferring print log data including data indicative of the number of sheets printed as counted by the counter means.

In order to achieve the foregoing object, a document read system of the present invention is characterized by being composed of a scanner having at least a scanning function, and a portable terminal equipment connectible to the scanner, wherein:

the scanner includes:

portable terminal equipment connection means to be connected to the portable terminal equipment for exchanging data with the portable terminal equipment, and image data transfer means for transferring read image data to the portable terminal equipment; and the portable terminal equipment includes:

scanner connection means to be connected to the scanner for exchanging data with the scanner, image data receiving means for receiving image data transferred from the scanner, image data storage means for storing received image data, and communication data transmission means for transmitting stored image data as communication data to a desired receiving end.

According to the foregoing structure, for example, by reading data using as the scanner a copying machine having a scanning function installed in a convenience store, and transferring the read data to the portable terminal equipment, the portable terminal device can transmit the received read data to a desired receiving end.

It is preferable that the foregoing document read system be arranged such that the scanner further includes:

counter means for counting a number of sheets read out, and scan log data transfer means for transferring scan log data including data indicative of the number of sheets read out as counted by the counter means.

It is preferable that the foregoing document read system be arranged such that in the scanner, the scan log data transfer means transfers the scan log data to an aggregate server on a network.

It is preferable that the foregoing document read system be arranged such that the scanner further includes:

counter means for counting a number of sheets read out, wherein account data including the number of sheets read out as counted by the counter means is prepared, and the account data is transferred to the portable terminal equipment together with a message indicative of a completion of a reading operation.

It is preferable that the foregoing document read system be arranged such that after completing a reading operation and displaying a message indicative of a disconnection from the scanner in the display section of the portable terminal equipment, the account data is displayed in the display section.

For a fuller understanding of the nature and advantages of the invention, reference should be made to the ensuing detailed description taken in conjunction with the accompanying drawings.

DESCRIPTION OF THE EMBODIMENTS

First Embodiment

The following descriptions will explain one embodiment of the present invention referring to Figures.

Figure 1:
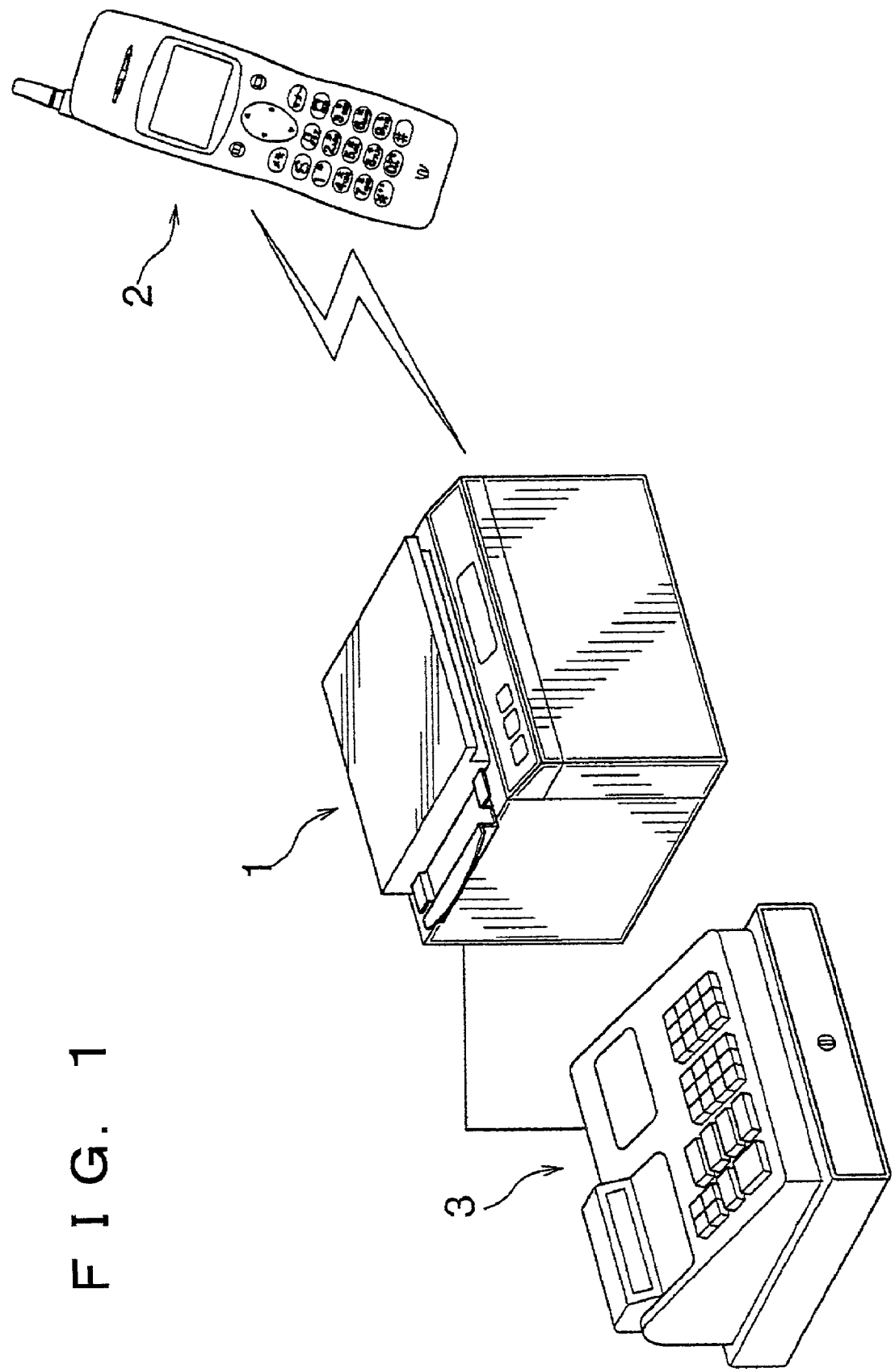
FIG. 1 is an explanatory view illustrating a schematic structure of a printer/scanner system in accordance with a first embodiment of the present invention.

FIG. 1 is an explanatory view illustrating a schematic structure of a printer/scanner system in accordance with the present embodiment.

As illustrated in FIG. 1, the printer/scanner system is composed of an MFP (Multi Function Printer) (1) serving as a printer/scanner device and a portable phone (2) connectible to the MFP (1).

The printer/scanner device of the present invention is provided with at least either one of a printing function and a scanning function, and is to be installed in a suitable place. In the present embodiment, the MFP (1) is provided with both the printing function and the scanning function, and is installed in a convenience store. This MFP (1) is connected to a cash register (3) in the convenience store.

The portable phone (2) of the present invention is arranged so as to be connectible to the MFP (1) by cable or wireless, and data communication is permitted between the portable phone (2) and the MFP (1). In the present embodiment, the portable phone (2) is connected by wireless to the MFP (1) by IrDA as one of the infrared ray data communication systems. The portable phone (2) of the present invention is arranged so as to be capable of receiving communication data by communication means of at least one of FAX, electronic mail (E-mail) including an attachment file, I-FAX, etc., and transmitting communication data by communication means of at least one of FAX, electronic mail including an attachment file, I-FAX, FTP (File Transfer Protocol), etc. In the present embodiment, the portable phone (2) is capable of receiving communication data by FAX, electronic mail (E-mail) including an attachment file, I-FAX, and transmitting communication data by FAX, electronic mail (E-mail) including an attachment file, I-FAX and FTP.

Figure 2:
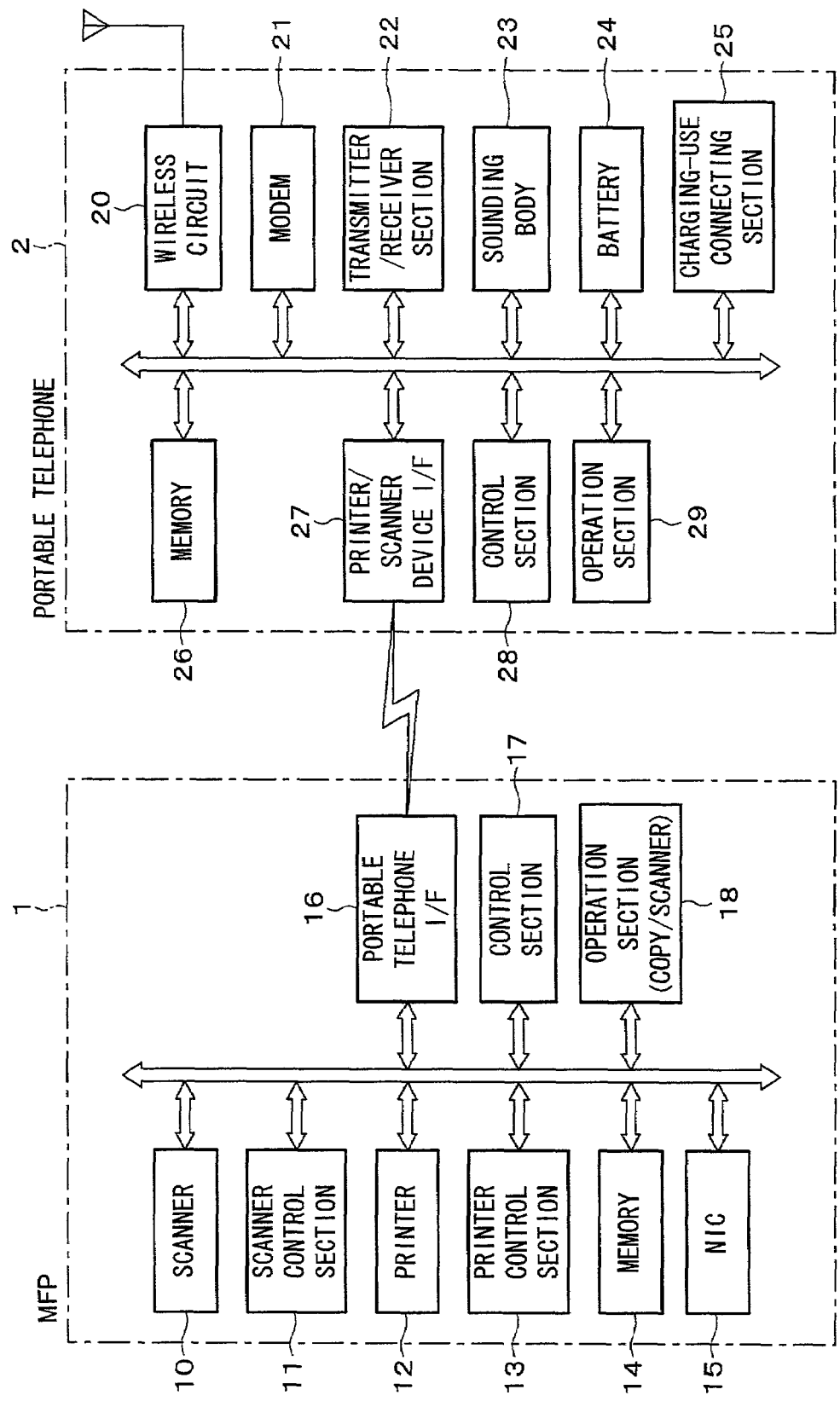
FIG. 2 is a block diagram illustrating one example for respective structures of an MFP and a portable phone in the printer/scanner system of FIG. 1.

FIG. 2 is a block diagram illustrating one example for respective structures of the MFP (1) and the portable phone (2) in the printer/scanner system of FIG. 1.

The MFP (1) includes a scanner (10), a scanner control section (11), a printer (12), a printer control section (13), a memory (14), an NIC (Network Interface Card) (15), a portable phone I/F (16), a control section (17) and an operation section (18). The MFP (1) is connected to the portable phone (2) by wireless via the portable phone I/F (16). The control section (17) is provided for controlling the entire MFP (1). The operation section (18) is provided with operation buttons for operating a printer, a scanner, etc., a display section, etc. The NIC (15) is an interface for connecting the MFP (1) to Ethernet, etc., as will be described later.

The portable phone (2) includes a wireless circuit (20), a modem (21), a transmitter/receiver section (22), a sounding body (23), a battery (24), a charging-use connecting section (25), a memory (26), a printer/scanner device I/F (27), a control section (28), and an operation section (29). The portable phone (2) not only performs a general telephonic communication, but also transmits and receives communication data via the wireless circuit (20). The control section (28) is provided for controlling the entire portable phone (2). The operation section (29) is provided with operation buttons and a display section. The operation buttons are provided for executing an operation of transmitting/receiving communication data, a printing operation, a scanning operation, etc.

Upon receiving communication data, the portable phone (2) stores received communication data in the memory (26). Specifically, in the case of receiving data by facsimile, the portable phone (2) is switched to a FAX receiving mode with a recognition of a FAX signal to be stored as TIFF (Tagged Image File Format) file. In the case of electronic mail (E-mail) without an attachment file, the portable phone (2) receives the electronic mail upon verifying a receipt of a mail by the mail server, and stores therein not only character data in a mail header and the main document but also an attachment image file. Here, upon receiving the attachment file in other format than the corresponding file format, or receiving attachment file in a volume exceeding its capacity, the portable phone (2) receives only the main document of the mail, and the attachment file is discarded. In the case of I-FAX, the portable phone (2) receives the mail upon verifying a receipt of the mail by the main server, and stores therein an image file (TIFF file).

FIGS. 3(a) through 3(k) show respective display contents in the operation section (29) of the portable phone (2) in the case of printing out the communication data as received by the portable phone (2) by the MFP (1). Next, operations of the portable phone (2) and the MFP (1) when printing out will be explained in reference to FIGS. 3(a) through 3(k).

Figure 3:
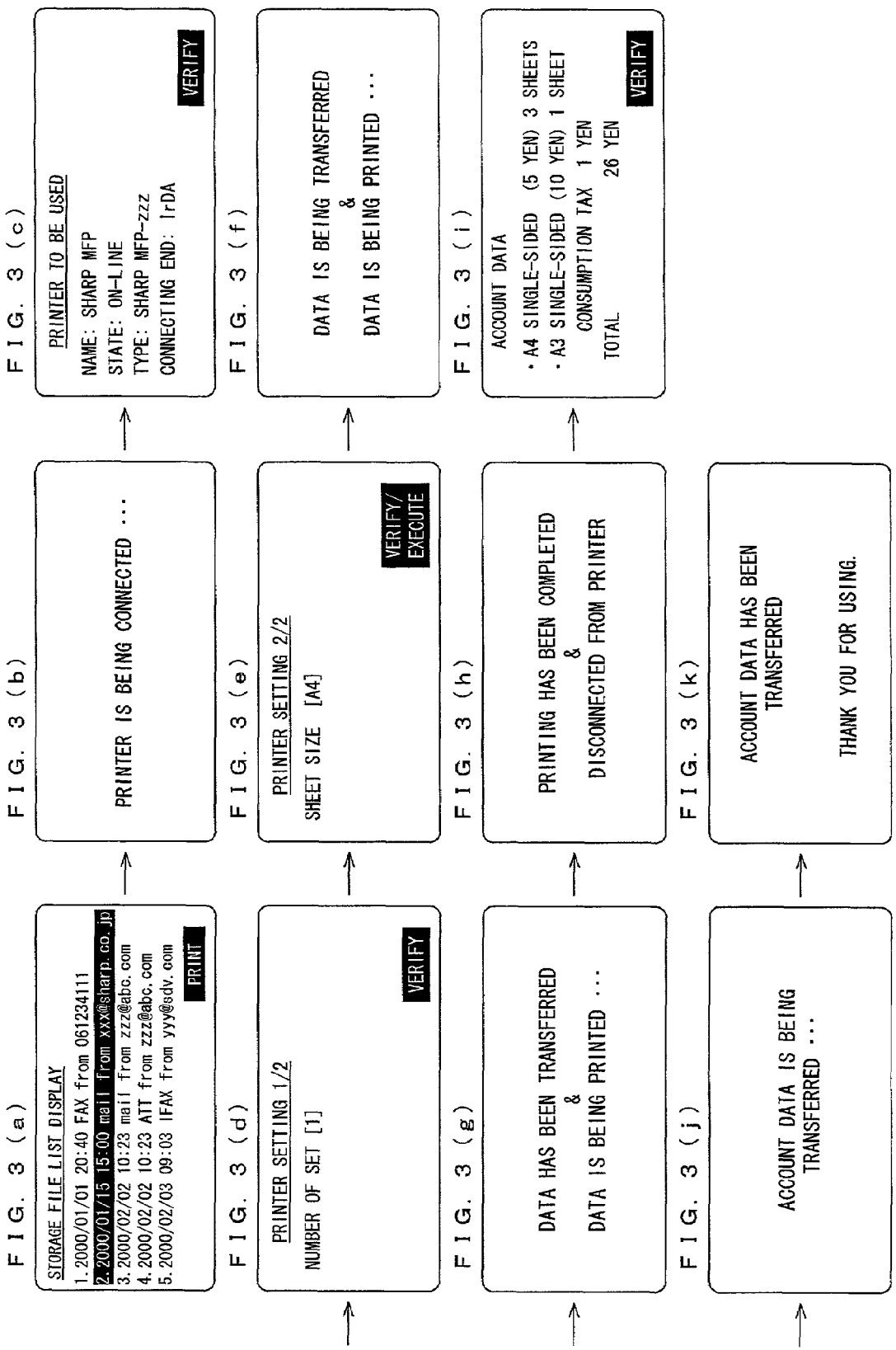
FIGS. 3(a) through 3(k) are explanatory views illustrating display screens in an operation section of the portable phone when printing.

When a printing operation is to be performed, by operating the operation section (29) of the portable phone (2), a list of communication data stored in the memory (26) is displayed, and the communication data to be printed out is selected from the list (see FIG. 3(a)). Then, after moving the portable phone (2) to a position at which transmission of data is permitted with respect to the MFP (1) by the IrDA, an operation button for the function "print" is depressed in the display of FIG. 3(a). As a result, the connection between the MFP (1) and the portable phone (2) is established, and the data communication is permitted between them. In this state, the data used in setting the print mode like the name of the MFP, the print density, monochrome/color data, sheet size, the number of sets to be copied (the number of copies), the name of a convenience store, etc, are transmitted from the MFP (1) to the portable phone (2); in the meantime, the telephone number is transmitted from the portable phone number (2) to the MFP (1).

Upon establishing the connection between the MFP (1) and the portable phone (2), in the operation section (29) of the portable phone (2), the message indicative of that "the MPP (1) is being used" is displayed (see FIG. 3(b)), and data regarding the MFP (1) to be used is displayed (see FIG. 3(c)). Then, after verifying the displayed data, the operation bottom corresponding to "verify" in the screen of FIG. 3(c) is depressed. Then, a screen for setting a print mode is displayed (see FIGS. 3(d) and 3(e)). Upon setting the print mode from these screens, a printing operation is executed. Specifically, first, a screen for setting a number of sets to be copied is displayed as illustrated in FIG. 3(d), and a number of sets to be copied is set by operating the corresponding operation bottom, and the number of sets to be copied is confirmed by depressing the operation button corresponding to "verify" in the screen of FIG. 3(d). Next, a screen for setting the sheet size is displayed as illustrated in FIG. 3(e), and the sheet size is set by operating the corresponding operation button. In the meantime, an instruction for executing the printing operation is given.

As a result, the print operation is started, and in the meantime, in the portable phone (2), the selected communication data is converted into print data, and the resulting print data are transferred from the portable phone (2) to the MFP (1) according to the data transfer protocol between the MFP (1) and the portable phone (2). By repeating the foregoing process, the print data are transferred sequentially from the portable phone (2) to the MFP (1), and the print data are printed out by the MFP (1) upon verifying the print page. At a start of the printing operation or in the middle of the printing operation, a message indicative of a completion of the receipt of page data is transmitted from the MFP (1) to the portable phone (2), and the number of sets to be copied, the print sheet size, a message indicative of a start of the page data transmission are transmitted from the portable phone (2) to the MFP (1). As the printing operation proceeds, screens illustrated in FIGS. 3(f) and 3(g) are displayed in the operation section (29) of the portable phone (2).

While the printing operation is being performed, the MFP (1) counts a number of sets for each sheet size, and upon completing the printing operation, account data including "the number of sets" is prepared, and a message indicative of the completion of the printing operation including the account data is transferred to the portable phone (2), and the connection between the MFP (1) and the portable phone (2) is cancelled. Then, a display indicative of a message "the MFP (1) is being used" disappears from the display section of the register (3), and a message indicative of that the connection between the MFP (1) and the portable phone (2) is cancelled is displayed in the operation section (29) of the portable phone (2) (see FIG. 3(h)), and subsequently account data is displayed (see FIG. 3(i)). Then, upon depressing the operation button corresponding to "verify" in the screen, the account data is transferred from the portable phone (2) to the telephone company, and a message indicative of that "the account data is being transferred" is displayed in the operation section (29) (see FIG. 3(j)). Upon completing the transfer of the account data, a message indicative of that "the account data has been transferred" is displayed in the operation section (29) (see FIG. 3(k)), thereby terminating the process. Then, the telephone company settles the use fees of the MFP (1) with respect to the owner of the MFP (1) based on the account data transferred, and charges the user of the portable phone (2) for the use fees of the MFP (1) in addition to the charge for call.

In the portable phone (2), the image data read out by the MFP (1) are stored in the memory (26), and this data can be transmitted as communication data. In the case of FAX transmission, the FAX number of the receiving end is specified, and the image data as stored in the memory (26) are transmitted by the generally used FAX transmission system. In the case of the I-FAX transmission, the mail address of the receiving end is specified, and the image data stored in the memory (26) are transmitted in the I-FAX mode via the internet. In the case of the electronic mail transmission, the mail address of the receiving end is specified, and the image data stored in the memory (26) is added to the mail, and is transmitted over the internet by the SMTP (Simple Mail Transfer Protocol). In the case of the FTP transmission, the receiving end of the FTP (the name of machine, or IP address) is specified, and the image data stored in the memory (26) is transmitted over the internet by the FTP. In the case of transmission over the internet, the packet communication network of the portable phone is used.

FIGS. 4(a) through 4(i) illustrate display screens in sequence in the operation section (29) of the portable phone (2) when storing the image data as read out from a sheet, etc., by the MFP (1) in the memory (26) of the portable phone (2), and transmitting the image data stored in the memory (26). Next, referring to these display screens, operations of the MFP (1) and the portable phone (2) when reading out the image data and transmitting the image data will be explained.

When a reading operation of the image data is to be performed, the portable phone (2) is moved to a position at which transmission of data is permitted with respect to the MFP (1) by the IrDA, and then the image data transmission is selected in the operation section (29) of the portable phone (2). As a result, the connection between the MFP (1) and the portable phone (2) is established, and the data communication is permitted between them. In this state, the name of the MFP, the data used in setting the print mode, and the name of the convenience store are transmitted from the MFP (1) to the portable phone (2), and in the meantime, the telephone number, etc., of the portable phone (2) are transmitted from the portable phone (2) to the MFP (1).

Figure 4:
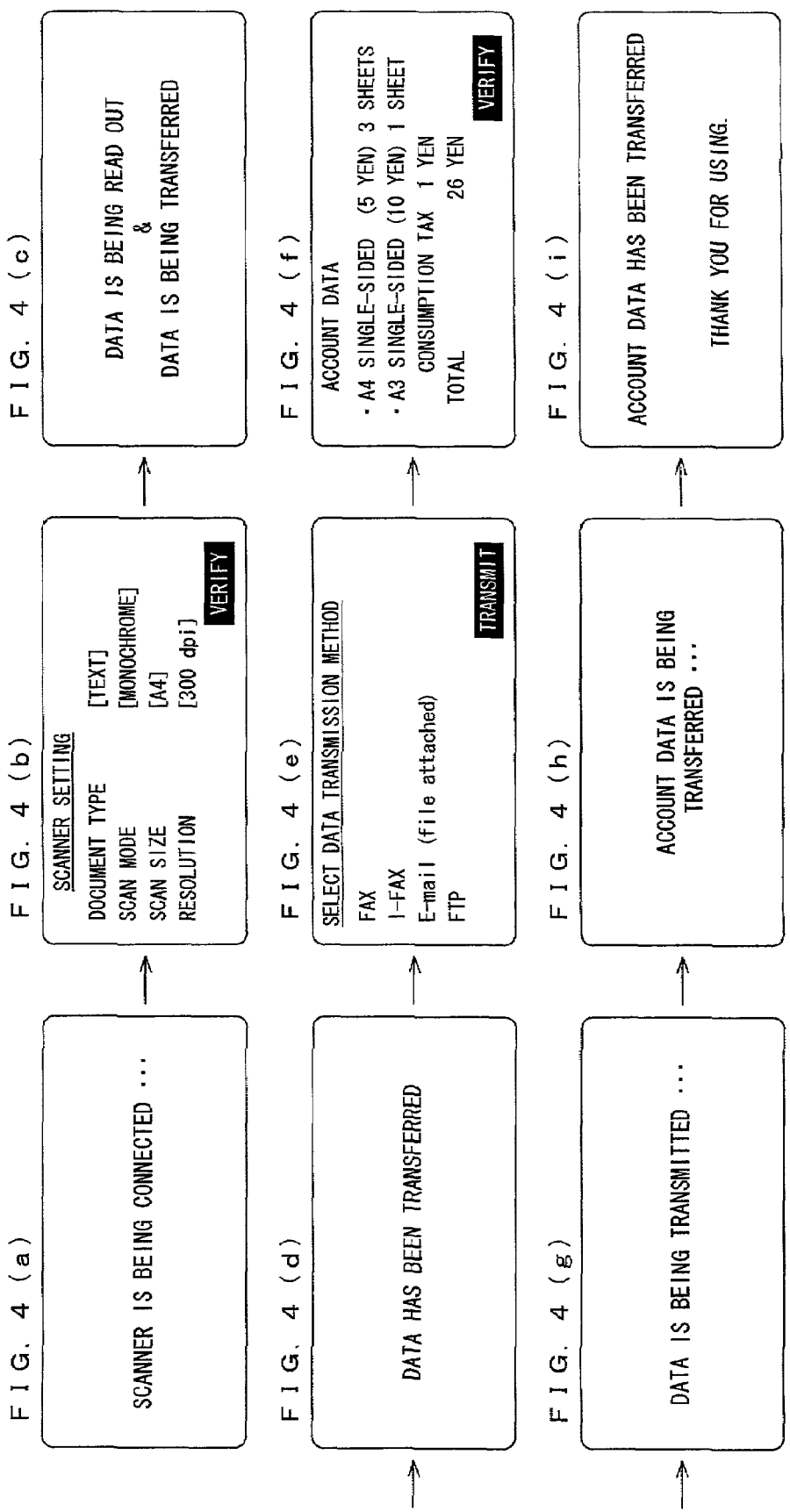
FIGS. 4(a) through 4(i) are explanatory views illustrating display screens in an operation section of the portable phone when reading out.

Upon establishing the connection between the MFP (1) and the portable phone (2), a message "MFP (1) is being used" is displayed in the display section of the cash register (3) and also in the operation section (29) of the portable phone (2) (see FIG. 4(a)), and then a screen for setting the read-out mode is displayed (see FIG. 4(b)), and the read-out mode is selected from this display screen, and the mode as selected is verified by depressing the operation button corresponding to "verify" in the screen of FIG. 4(b).

As a result, the reading out operation is started, and the image data recorded in the sheet, etc., are read out by the MFP (1), and the page data are transferred to the portable phone (2) in order to be stored in the memory (26). At a start of the printing operation or in the middle of the printing operation, a message indicative of a start of the page data transmission is transmitted from the MFP (1) to the portable phone (2), and the data regarding the read-out mode, and the message indicative of the completion of the receipt of the page data, etc., are transmitted from the portable phone (2) to the MFP (1). While the reading operation is being performed, the screen illustrated in FIG. 4(c) is displayed in the operation section (29) of the portable phone (2).

While the printing operation is being performed, the MFP (1) counts a number of sheets read out for each sheet size, and upon completing the printing operation, account data including "the number of sheets" read out for each sheet size is prepared, and a message indicative of the completion of the read-out operation including the account data is transferred to the portable phone (2), and the connection between the MFP (1) and the portable phone (2) is cancelled. Then, a display indicative of that "the reading out operation has been completed, and the connection between the portable phone (2) and the MFP (1) is cancelled" is displayed in the operation section (29) of the portable phone (2) (see FIG. 4(d)), and a screen for selecting the data transmission system is displayed (see FIG. 4(e)). Then, a data transmission system is selected from the display screen, and an operation button corresponding to "transmit" in the screen of FIG. 4(e) is depressed upon selecting the data transmission system. Then, account data is displayed (see FIG. 4(f)), and upon depressing the operation button corresponding to "verify" in this screen, the data transmission is started by the selected data transmission system, and a message indicative of that "the data transmission has been started" is displayed (see FIG. 4(g)). Upon completing the data transmission, the account data is transferred from the portable phone (2) to the telephone company, and a message indicative of that "the account data is being been transferred" is displayed in the operation section (29) (see FIG. 4(h)). Then, upon completing the transfer of the account data, a message indicative of that "the account data has been transferred" is displayed in the operation section (29) (see FIG. 4(i)), and then, the process is terminated. Then, the telephone company settles the use fees of the MFP (1) with respect to the owner of the MFP (1) based on the account data transferred, and charges the user of the portable phone (2) for the use fees of the MFP (1) in addition to the normal charge for call.

As described, the data output system of the present invention is characterized by being composed of i) a portable terminal equipment provided with data storage means for storing data received via a communication line, and ii) a data output device provided with portable terminal connection means, to be connected to the portable terminal equipment, for outputting the data stored in the data storage means of the portable terminal equipment, wherein:

the portable terminal equipment includes:

a display section for displaying received data, and an instructing section for selecting at least one of received data displayed in the display section and instructing the data output means to output the selected data; and the data output device includes:

a data communication section which starts communication of data according to an output instruction given from the portable terminal equipment.

According to the data output system of the foregoing structure, the portable terminal equipment is connected to the data output device after confirming the data to be requested for printing, and the connected data output device executes a data output process according to the output instruction. Therefore, until the selection of the data to be requested for printing has been completed, other user can use the data output device, thereby realizing a desirable service environment which can be used by many users in an efficient way. Moreover, in the case where the data output device has been used by other user, the data to be requested for printing can be selected by operating the portable terminal equipment in a wait state before giving an output instruction to that data output device.

The data to be communicated by the data communication section preferably includes data received by the portable terminal equipment data regarding the data output device. The data regarding the data output device may include data for use in setting a print mode and data regarding an installation place of the data output device.

It is desirable that the foregoing data output system be arranged such that upon establishing a connection between the portable terminal equipment and the data output device, the data regarding the data output device is transmitted from the data output device to the portable terminal equipment.

It is also desirable be arranged such that upon establishing a connection between the portable terminal equipment and the data output device, the data regarding the data output device is displayed in the display section of the portable terminal equipment.

It is also desirable that a screen for setting a print mode is displayed in the display section.

It is preferable that the portable terminal equipment include communication data conversion means for converting selected communication data into a printable format.

It is preferable that the portable terminal equipment includes:

connection means to be connected to the data output device for exchanging data with the data output device; and communication data receiving means for receiving communication data.

It is also preferable that the portable terminal equipment includes:

print mode setting means for setting a print mode when printing selected communication data.

It is preferable that the data output system be arranged such that the data output device further includes:

print data obtaining means being capable of obtaining print data stored in the portable terminal equipment via the portable terminal equipment connection means, and printing means for printing the print data obtained by the print data obtaining means.

The document read system of the present invention is characterized by being composed of a scanner having at least a scanning function, and a portable terminal equipment connectible to the scanner, wherein:

the scanner includes:

portable terminal equipment connection means to be connected to the portable terminal equipment for exchanging data with the portable terminal equipment, and image data transfer means for transferring read image data to the portable terminal equipment; and the portable terminal equipment includes:

scanner connection means to be connected to the scanner for exchanging data with the scanner, image data receiving means for receiving image data transferred from the scanner, image data storage means for storing received image data, and communication data transmission means for transmitting stored image data as communication data to a desired receiving end.

According to the foregoing structure, for example, by reading data using a copying machine having a scanning function as the scanner installed in a convenience store, and transferring the read data to the portable terminal equipment, it is permitted for the portable terminal device to transmit the received read data to a desired receiving end.

Second Embodiment

The following descriptions will discuss another embodiment of the present invention in reference to Figures.

Figure 5:
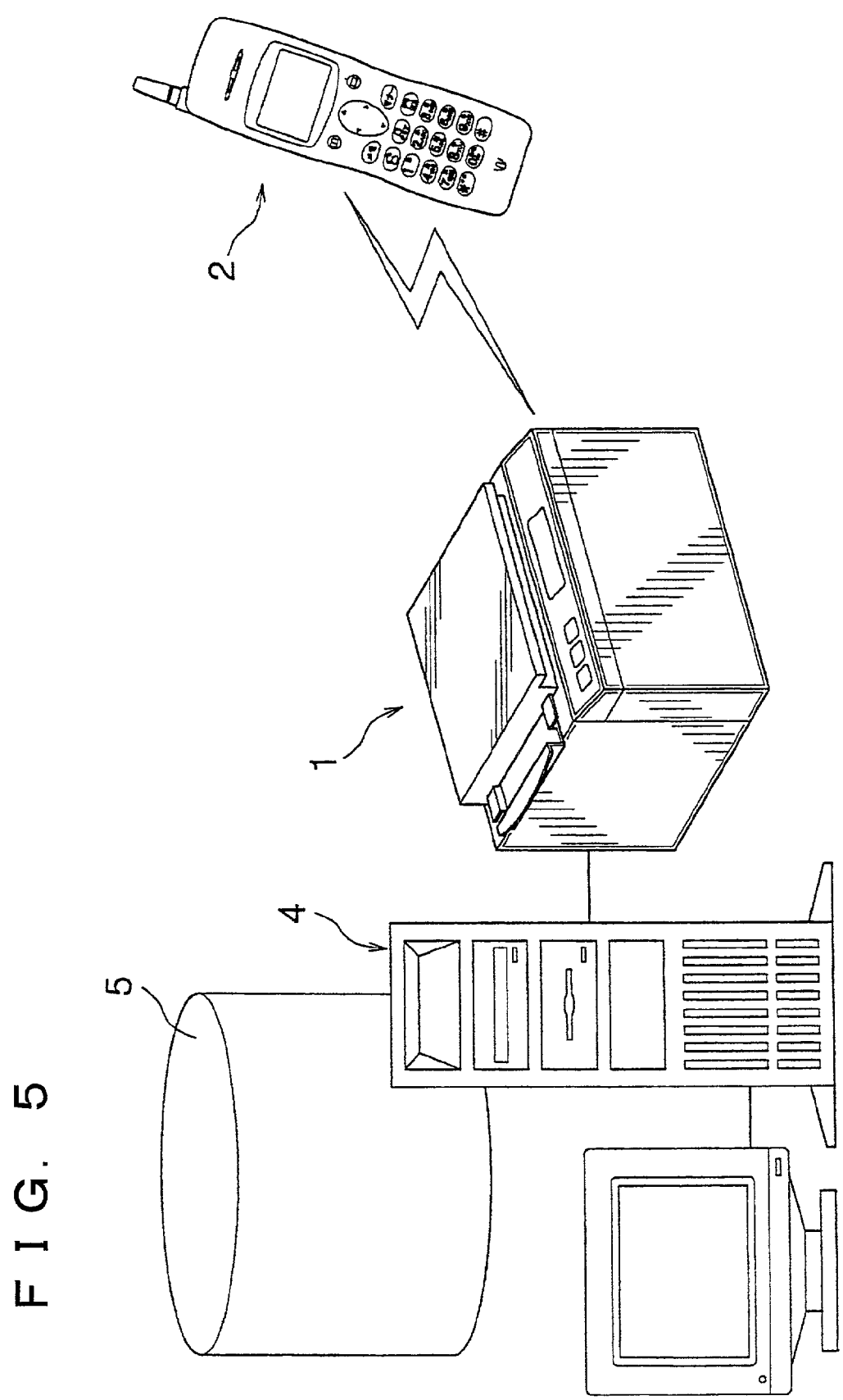
FIG. 5 is an explanatory view illustrating a schematic structure of a printer/scanner system in accordance with a second embodiment of the present invention.

FIG. 5 illustrates a schematic structure of the printer/scanner system in accordance with the present embodiment.

As illustrated in FIG. 5, the printer/scanner system of the present embodiment is composed of the MFP (1) and the portable phone (2) connectible to the MFP (1). The MFP (1) and the portable phone (2) adopted in the present embodiment have the same structures as those of the first embodiment. The MFP (1) is connected to an aggregate server (4) via LAN (Local Area Network) such as Ethernet, etc. This aggregate server (4) has a user DB (data base) (5).

In the printer/scanner system of FIG. 5, when printing out the communication data received by the portable phone (2) by the MFP (1), the MFP (1) transfers upon completing the printing operation the print log data including the telephone number of the portable phone (2) of the print requesting end, number of sheets printed for each sheet size, etc., to the aggregate server (4). Based on the print log data transferred, the aggregate server (4) calculates use fees of the MFP (1), and the user DB (5) is updated. Then, the use fees of the MFP (1) are transferred to the telephone company. Or the use fees are transferred to the MFP (1). In the former case, the telephone company settles the use fees of the MFP (1) with respect to the owner of the MFP (1) based on the account data transferred thereto, and charges the user of the portable phone (2) for the use of the MFP (1) in addition to the normal charge for call. In the latter case, based on the transferred account data, the user of the portable phone (2) settles the use fees of the MFP (1) in that place. Other than the foregoing, the structure of the present embodiment is the same as that of the first embodiment.

In the printer/scanner system of FIG. 5, when the portable phone (2) transfers the image data read out by the MFP (1), upon completing the reading out operation, the MFP (1) transfers scan log data including the telephone number of the portable phone (2), and the number of sheets read out for each sheet size, to the aggregate server (4). The aggregate server (4) calculates the use fees of the MFP (1) based on the scan log data received from the MFP (1), and the user DB (5) is updated. Thereafter, the foregoing printing process is repeated.

The respective structures of the printer/scanner system, the MFP (1), the portable phone (2), etc., are not limited to the above structures, and various modifications thereof are permitted within the scope of the present invention.

In the present embodiment, the portable phone is used as the portable terminal equipment; however, PDA, etc., may be adopted. The portable terminal equipment such as portable phone, PDA, etc., is arranged so as to be capable of transmitting and receiving communication data; however, it may be arranged so as to be capable of performing only either one of the transmission and receiving operations. Similarly, in replace of the printer/scanner device provided with both the printing function and the scanning function, those provided with either one of the printing function or the scanning function may be adopted. Further, by combining the portable terminal equipment capable of at least receiving the communication data and a device provided with at least printing function, or combining a portable terminal equipment capable of at least transmitting communication data and a device provided with at least a scanning function, etc., the printer/scanner system can be established.

In the structure of the data output system of the first embodiment, it is preferable that the data output device further includes:

counter means for counting a number of sheets printed, and print log data transfer means for transferring print log data including data indicative of the number of sheets printed as counted by the counter means.

In the structure of the document read system of the first embodiment, it is preferable that in the scanner, the scan log data transfer means transfers the scan log data to an aggregate server on a network.

It is preferable that the foregoing document read system be arranged such that the scanner further includes:

counter means for counting a number of sheets read out, wherein account data including the number of sheets read out as counted by the counter means is prepared, and the account data is transferred to the portable terminal equipment together with a message indicative of a completion of a reading operation.

It is preferable that the foregoing document read system be arranged such that after completing a reading operation and displaying a message indicative of a disconnection from the scanner in the display section of the portable terminal equipment, the account data is displayed in the display section.

It is preferable that the foregoing document read system be arranged such that the scanner further includes:

counter means for counting a number of sheets read out, and scan log data transfer means for transferring scan log data including data indicative of the number of sheets read out as counted by the counter means.

As described, the first portable terminal equipment of the present invention which is provided with a telephone function or connectible to the portable phone, is characterized by including:

connection means to be connected to a device provided with at least a printing function for exchanging data;

communication data receiving means for receiving communication data;

communication data storage means for storing received communication data;

communication data list display means for displaying a list of stored communication data in the communication data storage means;

communication data selection means for selecting communication data to be printed out from the stored communication data;

print mode setting means for setting a print mode when printing the selected communication data; and communication data conversion means for converting selected communication data into printable format.

Examples of the portable terminal equipment having a telephone function include portable phones including PHS (Personal Handyphone System), PDA storing the telephone function, etc. Examples of the portable terminal equipment connectible to the portable phone include PDA, etc.

The printer/scanner device is, for example, installed in a convenience store.

The printer/scanner device connection means (27) is connected to the printer/scanner device by cable or wireless. The examples of wireless connection include those utilizing infrared ray, Bluetooth, etc.

Examples of communication data include document data, image data, etc. The communication data are transmitted by appropriate communication means such as FAX, electronic mail including an attachment file; I-FAX, etc., and are received by the communication data receiving means.

As described, it is desirable that the data output system of the first embodiment be arranged so as to further include:

the data output means further includes counter means for counting a number of sheets printed; and account data including the number of sheets printed as counted by the counter means is prepared, and the account data is transferred to the portable terminal equipment together with a message indicative of a completion of a printing operation.

It is also preferable that after completing a printing operation and displaying a message indicative of a disconnection from the data output device in the display section of the portable terminal equipment, the account data is displayed in the display section.

In the first portable terminal of the present invention, the selected communication data is transferred to the printer/scanner device via the printer/scanner connection means to be printed out on a sheet, etc.

According to the first portable terminal equipment of the present invention, the contents of the received communication data can be confirmed with ease by printing out the received data on a sheet.

The first portable terminal equipment of the present invention may be arranged so as to further include: account data transfer means for transferring account data prepared by the connected printer/scanner device to a telephone company after the completion of a printing operation.

In this case, based on the account data transferred, the telephone company settles use fees of the printer/scanner device with respect to the owner of the printer/scanner device, such as a convenience store, and in turn charges the user of the portable terminal equipment for the use fees of the printer/scanner device in addition to the charge for call.

In this way, it becomes not necessary for the user of the portable terminal equipment to clear up the use fee of the printer/scanner device each time, and, an account can be settled, for example, by paying off the use fees in full with respect to the telephone company together with the normal telephone.

The second portable terminal equipment of the present invention, which is provided with a telephone function or connectible to the portable phone, is characterized by including:

a printer/scanner device connection means to be connected to a printer/scanner device having at least a printing function for exchanging data;

image data receiving means for receiving image data as input from the printer/scanner device;

image data storage means for storing image data as received; and communication data transmission means for transmitting stored image data as communication data.

The communication data transmission means transmits image data by means of communication means such as FAX, an electronic mail (E-mail) including an attachment file, I-FAX, FTP (File Transfer Protocol), etc.

In the foregoing second portable terminal equipment of the present invention, the image data as read out by the printer/scanner device are input in the portable terminal equipment via the printer/scanner device connection means to be transmitted by the communication data transmission means.

According to the second portable terminal equipment of the present invention, the image data read out from a recording sheet can be transmitted from the portable terminal equipment.

The second portable terminal equipment of the present invention may be arranged so as to include account data transfer means for transferring the account data prepared by the connected printer/scanner device after the completion of the image data transfer to the telephone company.

In this way, as in the above-explained case, it becomes not necessary for the user of the portable terminal equipment to settle a payment for each use, and the charge can be paid off in full by making a payment to the telephone company together with the normal charge for call. Therefore, it becomes more convenience for the user.

The third portable terminal equipment of the present invention either has a telephone function or connectible to the portable phone, is characterized by including:

printer/scanner device connection means to be connected to the printer/scanner device having at least either one of the printing function and the scanning function for exchanging data;

communication data receiving means for receiving communication data;

communication data storage means for storing received communication data;

communication data list display means for displaying a list of the stored communication data;

communication data selection means for selecting communication data to be printed out from the stored communication data;

print mode setting means for setting a print mode for printing selected communication data;

communication data conversion means for converting the selected communication data into a printable format;

image data receiving means for receiving image data as input from the printer/scanner device;

image data storage means for storing received image data; and communication data transmission means for transmitting stored image data as communication data.

According to the third portable terminal equipment of the present invention, by printing out the received communication data on a sheet, the contents can be confirmed with ease, and the image data recorded on a sheet can be read out and transmitted from the portable terminal equipment.

In this way, as in the above-explained case, it becomes not necessary for the user of the portable terminal equipment to settle a payment for each use, and the charge can be paid off in full by making a payment to the telephone company together with the normal charge for call. Therefore, it becomes more convenience for the user.

The first printer/scanner device of the present invention is provided with at least one of a printing function and a scanning function, and is connectible to the first or third portable terminal equipment of the present invention is characterized by including:

portable terminal equipment connection means to be connected to the portable terminal equipment for exchanging data;

print data obtaining means being capable of obtaining print data stored in the portable terminal equipment via the portable terminal equipment connection means;

printing means for printing the print data obtained by the print data obtaining means;

counter means for counting a number of sheets for each sheet size; and print log data transfer means for transferring print log data including counted number of sheets for each sheet size.

In the foregoing manner, the portable terminal equipment connection means is connected to the printer/scanner device via cable or wireless.

In the first printer/scanner device, print data obtained by the print data obtaining means via the portable terminal connection means are printed on a sheet by the printing means.

According to the first printer/scanner device of the present invention, it is therefore possible to confirm the contents of the communication data received by the portable terminal equipment with ease by printing out the received communication data.

The first printer/scanner device of the present invention may be arranged such that the print log transfer data means transfers the print log data to an aggregate server on the network.

In this case, an aggregate server calculates an amount of charge for using the printer/scanner device. Then, the charge is transferred to the telephone company. It may be also arranged so as to transfer the account for using the printer/scanner device to the telephone company. Or, an amount of charge for using the printer/scanner device is transferred to the printer/scanner device. In the former case, the telephone company makes a payment for using the printer/scanner device, and charges the user of the portable terminal equipment for an amount adding a charge for using the printer/scanner device to a normal charge for call. On the other hand, in the latter case, based on the account data transferred, the user of the portable terminal equipment settles an account at the place the user uses the printer/scanner device.

The first printer/scanner device of the present invention may be arranged such that the print log data transfer means transfers the print log data to the portable terminal equipment.

In this case, the portable terminal equipment transfers the account data obtained from the print log data transferred to the telephone company, and the telephone company settles use fees of the printer/scanner device with respect to the owner of the printer/scanner device such as a convenience store, and in turn charges the user of the portable phone for the use fees of the printer/scanner device in addition to the charge for call.

The second printer/scanner device of the present invention which may be provided with both a printing function and a scanning function and at least provided with a scanning function, and which is connectible to the second or third terminal equipment device is characterized by including:

portable terminal equipment connection means for exchanging data to be connected to the portable terminal equipment;

image data transfer means for transferring the image data as read out to the portable terminal equipment;

counter means for countering the number of sheets read out for each sheet size; and scan log data transfer means for transferring scan log data including a number of sheets read out as counted for each size.

In the printer/scanner device of the present invention, the image data as read out are transferred to the portable terminal equipment by the image data transfer means via the portable terminal equipment connection means.

Therefore, according to the second printer/scanner device of the present invention, it is possible to transmit from the portable terminal equipment the image data read out from a sheet.

The second printer/scanner device of the present invention may be arranged such that the scan log data transfer means transfers the scan log data to an aggregate server on a network.

The second printer/scanner device of the present invention may be arranged such that the scan log data transfer means transfers the scan log data to the portable terminal equipment.

The third printer/scanner device of the present invention which is provided with the printing function and the scanning function and is connectible to one of the foregoing first to third portable terminal equipments is characterized by including:

portable terminal equipment connection means to be connected to the portable terminal equipment for exchanging data;

print data obtaining means being capable of obtaining print data stored in the portable terminal equipment via the portable terminal equipment connection means;

printing means for printing print data obtained by the print data obtaining means;

counter means for counting a number of sheets for each sheet size;

print log data transfer means for transferring the print log data including data indicative of number of sheets printed as counted for each sheet size;

image data transfer means for transferring image data as read out to the portable terminal equipment;

counter means for counting a number of sheets read out for each sheet size; and scan log data transfer means for transferring scan log data including data indicative of a number of sheets read out as counted for each sheet size.

According to the third printer/scanner device, it is possible to confirm the contents of the communication data received by the portable terminal equipment with ease by printing out the communication data on a sheet or the like or it is possible to transmit the image data read out from a sheet or the like from the portable terminal equipment.

The third printer/scanner device of the present invention may be arranged such that the print log data transfer means and scan log data transfer means respectively transfer the print log data and the scan log data to the aggregate server on the network.

The foregoing third printer/scanner device of the present invention may be arranged such that the print log data transfer means and the scan log data transfer means transfer the print log data and the scan log data respectively to the portable terminal equipment.

The first printer/scanner system of the present invention is characterized by including the first or third portable terminal equipment of the present invention and the first printer/scanner device of the present invention.

According to the first printer/scanner system of the present invention, as in the aforementioned case, it is possible to confirm the contents of the communication data as received by the portable terminal equipment with ease by printing out the communication data on a sheet, etc., by the printer/scanner device.

The second printer/scanner system of the present invention may be arranged so as to include the second or third portable terminal equipment of the present invention and the second printer/scanner device of the present invention.

According to the second printer/scanner system of the present invention, it is possible to transmit the image data as recorded on a sheet, etc., from the portable terminal equipment by reading out the image data as recorded on a sheet, etc., by the printer/scanner device.

The third printer/scanner system of the present invention may be characterized by including any one of the first through third portable terminal equipments, and the third printer/scanner device of the present invention.

According to the third printer/scanner system of the present invention, the contents of the communication data as received by the portable terminal equipment can be confirmed with ease by printing out the communication data on a sheet, etc. Moreover, the image data as recorded on a sheet can be transmitted from the portable terminal equipment by reading out the image data as recorded on a sheet by the printer/scanner device.

The invention being thus described, it will be obvious that the same may be varied in many ways. Such variations are not to be regarded as a departure from the spirit and scope of the invention, and all such modification as would be obvious to one skilled in the art are intended to be included within the scope of the following claims.

What is claimed is:

1. A data output system composed of i) a portable terminal equipment provided with data storage means for storing data received via a communication line, and ii) a data output device provided with portable terminal connection means, wirelessly connectable to the portable terminal equipment, for outputting data stored in the data storage means of said portable terminal equipment, wherein:

said portable terminal equipment includes:

a display section for displaying received data, and an instructing section for selecting at least one of the received data displayed in the display section and instructing said data output device to output the selected data;

data output device connection means for wireless connection to the portable terminal connection means of the data output device, and a control section for establishing a wireless connection between the portable terminal connection means and the data output device connection means in response to an output instruction given from the instructing section, for reading out the selected data from the data storage means, for outputting the selected data to the data output device, and for instructing the data output device to output the selected data; wherein said data output device includes:

a data communication section which starts a communication of data between said portable terminal connection means and said data output device connection means according to the establishment of said wireless connection.

2. The data output system as set forth in claim 1, wherein:
the data to be communicated by said data communication section includes data received by said portable terminal equipment.

3. The data output system as set forth in claim 1, wherein:
the data to be communicated by said data communication section includes data regarding said data output device.

4. The data output system as set forth in claim 1, wherein:
said data output device is a printer.

5. The data output system as set forth in claim 3, wherein:
the data regarding said data output device includes data for use in setting a print mode.

6. The data output system as set forth in claim 3, wherein:
the data regarding said data output device includes data regarding an installation place of said data output device.

7. The data output system as set forth in claim 3, wherein:
upon the establishment of a wireless connection between said portable terminal equipment and said data output device, data regarding said data output device is transmitted from said data output device to said portable terminal equipment.

8. The data output system as set forth in claim 7, wherein:
upon the establishment of a wireless connection between said portable terminal equipment and said data output device, data regarding said data output device is displayed in the display section of said portable terminal equipment.

9. The data output system as set forth in claim 7, wherein:
a screen for setting a print mode is displayed in said display section.

10. The data output system as set forth in claim 1, further comprising:
communication data conversion means for converting selected communication data into a printable format.

11. The data output system as set forth in claim 1, wherein:
said data output device further includes counter means for counting a number of sheets printed and for generating account data, said account data including the number of sheets printed as counted by said counter means and a use fee associated with the use of said data output device;
wherein upon the completion of a printing operation by the data output device, said account data is wirelessly transferred to said portable terminal equipment together with a message indicative of the completion of said printing operation.

12. The data output system as set forth in claim 10, wherein:
upon the completion of data communication between the portable terminal equipment and the data output device, the portable terminal device displays a message in the display section indicative of (i) the disconnection of the portable terminal equipment from the data output device in the display section of said portable terminal equipment, and (ii) account data associated with the use of the data output device.

13. The data output system as set forth in claim 1, wherein:
said portable terminal equipment either functions as a telephone or can be connected to a portable phone.

14. The data output system as set forth in claim 1, wherein said portable terminal equipment further includes:
connection means to be connected to said data output device for exchanging data with said data output device, and
communication data receiving means for receiving communication data.

15. The data output system as set forth in claim 1, wherein said portable terminal equipment further includes:
print mode setting means for setting a print mode for printing selected communication data.

16. The data output system as set forth in claim 1, wherein said data output device further includes:
print data obtaining means for obtaining print data stored in said portable terminal equipment via said portable terminal connection means, and
printing means for printing the print data obtained by said print data obtaining means.

17. The data output system as set forth in claim 1, wherein said data output device further includes:
counter means for counting a number of sheets printed, and
print log data transfer means for transferring print log data including data indicative of the number of sheets printed as counted by said counter means.

18. A document read system composed of a scanner having at least a scanning function, and a portable terminal equipment wirelessly connectible to said scanner, wherein:
said scanner includes:
portable terminal equipment connection means connected to said scanner for exchanging data with said portable terminal equipment, and
image data transfer means for transferring image data, read by said scanner in response to a read instruction given from the portable terminal equipment, to said portable terminal equipment; and
said portable terminal equipment includes:
a display section for displaying image data to be sent,
an instruction section for selecting at least one of data displayed in the display section and giving a read instruction,
scanner connection means connected to said portable terminal equipment connection means for exchanging data with said scanner,
a control section for establishing a wireless connection between the portable terminal connection means and the scanner connection means in response to a read instruction,
image data storage means for storing image data transferred to said portable terminal equipment from said scanner via the portable terminal connection means and the scanner connection means, and
communication data transmission means for transmitting stored image data as communication data to a desired receiving end.

19. The document read system as set forth in claim 18, wherein said scanner further includes:
counter means for counting a number of sheets read out, and
scan log data transfer means for transferring scan log data including data indicative of the number of sheets read out as counted by said counter means.

20. The document read system as set forth in claim 19, wherein:
said scan log data transfer means transfers the scan log data to an aggregate server on a network.

21. The document read system as set forth in claim 18, wherein:
said scanner further includes counter means for counting a number of sheets read out; and
account data including the number of sheets read out as counted by said counter means and a data output device usage fee is prepared, and said account data is transferred to said portable terminal equipment together with a message indicative of a completion of a reading operation.

22. The document data read system as set forth in claim 21, wherein:
after completing a reading operation and displaying a message indicative of a disconnection from said scanner in the display section of said portable terminal equipment, the account data is displayed in the display section.

23. A printer/scanner system comprising:
said portable terminal equipment of claim 1;
said data output device of claim 1; and
said scanner of claim 18.

* * * * *